United States Patent Office 2,945,851
Patented July 19, 1960

2,945,851

PROCESS FOR OBTAINING AN ACTIVE SUBSTANCE WITH ACTION ON THE HEART FROM PLANTS OF THE VOACANGA GENUS

Ulrich Renner, Biberach (Riss), Wurttemberg, Germany, assignor to Geigy Chemical Corporation, Ardsley, N.Y., a corporation of Delaware No Drawing. Filed June 19, 1958, Ser. No. 743,008

Claims priority, application Switzerland June 21, 1957

15 Claims. (Cl. 260—236)

The object of the present invention is a process for obtaining a hitherto unknown active substance from plants of the Voacanga genus, especially from roots of *Voacanga africana* Stapf, in concentrated or pure form.

Up to the present the alkaloids voacangine, voacamine, voacaminine, vobtusine, voacaline and voacorine have been isolated from *Voacanaga africana* Stapf.

It is also known that total extracts from *Voacanga africana*, chiefly from its roots, are able to increase considerably the amplitude of contraction of isolated cold- and warm-blooded hearts. The heart activity was hitherto attributed to the alkaloids voacangine and voacamine, especially the salts of the latter with sulphuric acid and camphorsulphonic acid. The clinical action of these preparations on the deficient human heart is likewise described.

It has now been found that the preparations known up to the present are surpassed in their effect of stimulating heart action by a hitherto unknown active substance contained in the plant. Furthermore, this active substance has a potentiating effect on the action of analgesics of the morphine group. For the concentration and purification of this substance from the Voacanaga genus with the greatest activity up to the present, total extracts of plant parts of this genus, which can be obtained in the usual way, further described more particularly below, in aqueous solution of pH 2.8–3.8, preferably 3.5, are freed from undesired accompanying substances or impurities by extraction with an organic solvent immiscible with water, especially an aromatic hydrocarbon, an ether or a low molecular weight fatty acid ester, then the aqueous phase is adjusted to a pH value of over 4.5 and the mixture of crude bases, substantially freed from the already known voacangine, which is thereby liberated is separated. The mixture of crude bases is thereupon allowed to crystallise from a low molecular weight alkanol, preferably from methanol, if desired after a preliminary separation with the aid of adsorbents, the crystals, consisting chiefly of the already known voacamine, are separated and the hitherto unknown active substance is isolated from the alkanolic, preferably methanolic, filtrate, if desired with the aid of adsorbents. This active substance is a solid base, the hydrobromide of which crystallises from water or acetone in small colourless needles of melting point 266° (with decomposition).

Instead of a previously purified mixture of crude bases according to the foregoing process, there can also be used for the crystallisation from a low molecular weight alcohol according to the invention a mixture of crude bases which has been obtained from the complete extract by separation of the voacangine and other accompanying substances with the aid of an adsorbent, such as for example, aluminium oxide, silicic acid, kieselguhr or another silicate. Such a mixture of crude bases is obtained, for example, by chromatographing the complete extract on an aluminium oxide column and uniting the evaporation residues of the eluates obtained by means of weakly polar solvents or mixtures of the latter with non-polar solvents, i.e. weakly polar solvent mixtures such as, for example, mixtures of benzene and acetone in the proportions by volume of 9:1, or of benzene and diethyl ether in the proportions by volume of 3:1. These eluates, in addition to the hitherto unknown active substance, contain predominantly the voacamine which can be separated by crystallisation, while the voacangine is already eluted by non-polar solvents such as benzene. Further alkaloids and other impurities are eluted only by more strongly polar solvents or solvent mixtures, so that, in the case of this chromatography of the complete extracts, they can likewise be separated and are no longer present in the mixture of crude bases purified in this way. Such crude base mixtures are suitable preferably for the further treatment by crystallisation from a low molecular weight alkanol according to the invention. For this reason, mixtures of crude bases may also be treated which have been obtained from the complete extracts by the extraction according to the invention of their aqueous solutions of pH 2.8–3.8 with an organic solvent immiscible with water, before the further treatment with an adsorbent such as, for example, aluminium oxide. Since in this case the voacangine is already removed, a smaller quantity of adsorbent and solvent is used, for example on a substantially smaller aluminium oxide column, than for the chromatography of the complete extracts. The evaporation residues of the eluates obtained with weakly polar solvents or solvent mixtures are hereupon subjected to the treatment with a low molecular weight alkanol according to the invention.

Finally, a treatment with adsorbents, e.g. a chromatography of the evaporation residue of an alkanolic, preferably methanolic, filtrate on an aluminium oxide column can also be carried out only after the crystallisation from low molecular weight alkanols according to the invention, and by working up the evaporation residues of the eluates obtained with weakly polar solvents or solvent mixtures. Since in this case, in the crystallisation according to the invention more troublesome impurities are present, the crystallisation will then be repeated if necessary subsequent to the treatment with an adsorbent, i.e. the evaporation residues of the eluates obtained with weakly polar solvents or solvent mixtures can be crystallised from a low molecular weight alkanol and the crystallisate rejected. As opposed to the disadvantage of the repeated crystallisation there is the advantage of the further diminished consumption of adsorbent due to the previous partial separation of the voacamine.

Subsequent to the crystallisation from a low molecular weight alkanol according to the invention the hitherto unknown active substance is isolated from the evaporation residue of the alkanolic filtrate, preferably by means of one of the following methods. The multiplicative partition of the evaporation residue between an organic phase immiscible with water and a weakly acid, possibly buffered, aqueous phase, preferably of pH 4.0–4.2, in the known countercurrent distribution according to Craig is such a suitable preferred method, according to which the active substance required is separated from the known, less active, accompanying substances on the basis of differences in basicity.

By way of example, benzene can serve as the organic phase and a citric acid-phosphate buffer solution of pH 4.1 as the aqueous phase. Also suitable as organic phases are, for example, diethyl ether or ethyl acetate, or halogenated hydrocarbons such as chloroform, methylene chloride, ethylene chloride or trichlorethylene, or mixtures of these solvents.

For the separation of the components by partition between two phases there may also be used, instead of the counter-current process, partition chromatography, e.g. on a cellulose column, with the same or similar phases.

The multiplicative partition can also be carried out, however, so that the crude alkaloids dissolved partly as salts in water are brought into equilibrium in stages with the crude bases present in the organic phase in a way known per se according to Jansen.

A further method for the isolation of the hitherto unknown active substance consists in extracting the evaporation residue of the alkanolic filtrate with a low-boiling, substantially saturated, hydrocarbon or a mixture of such hydrocarbons. As the extracting means are especially suitable low-boiling alkanes or petroleum ethers, and also petrol (benzine) or ligroin, or cycloalkanes such as cyclohexane. On cooling such extracts of suitable concentration, the required active substance separates in almost pure form.

Finally, the hitherto unknown active substance can be isolated in a way known per se as a salt from the alkanolic filtrate, from an aqueous acid solution of its evaporation residue or possibly from a mixture of bases already concentrated by multiplicative partition or by extraction according to the aforementioned methods. The hydrohalides, which are relatively difficultly soluble in water, are particularly easy to separate and can be precipitated, for example, from solutions of the evaporation residues in dilute acetic acid by addition of alkali metal halides and recrystallised from water or acetone.

The hydrochloride crystallises in small colourless needles of melting point 267° (with decomposition) and rotation $[\alpha]_D^{16.5}$ —166° (in methanol). The already mentioned hydrobromide has rotation $[\alpha]_D^{22}$ —144° (in methanol). Its analysis gives the following values: C=58.65%, 58.75%; H=6.38%, 6.52%; N=6.75%, 6.83%.

The hydriodide crystallises from acetone in small colourless needles of melting point 264° (with decomposition) and rotation $[\alpha]_D^{26}$ —142° (in methanol). Its analysis gives the following values: C=58.15%, 53.22%; H=5.96%, 5.88%; N=5.39%.

The hitherto unknown active substance can be liberated in absolutely pure form from the aqueous solutions of the salts. It is insoluble in water, difficultly soluble in aliphatic hydrocarbons, readily soluble in benzene, chloroform, ethyl acetate, acetone, methanol, ethanol and ether. Its optical rotation $[\alpha]_D^{20}$ amounts to —174° (in chloroform). The analysis gives the following values: C=72.10%; H=7.59%; N=7.79%.

The ultra-violet spectrum in ethanol has maxima at 227.5 M$\mu$(Log $\epsilon$ ca. 4.44) and 292.5 m$\mu$(log $\epsilon$ Ca. 4.01). A minimum is present at 260 m$\mu$(log $\epsilon$ ca. 3.58).

In the short wave part of the infra-red spectrum (in chloroform) the following distinct bands appear: 2.79$\mu$; 2.91$\mu$; 5.85$\mu$; 6.20$\mu$ and 6.37$\mu$.

The newly discovered active substance is not identical with one of the alkaloids isolated up to the present from *Voacanga africana* Stapf and differs characteristically in its chemical and physical properties from those of these alkaloids described in the literature.

The active substance obtained according to the invention is a weak base which, besides the already mentioned halides, forms salts by reaction with acids or by double decomposition, for example, with the sulphuric acids, nitric acid, perchloric acid, the phosphoric acids, formic acid, acetic acid, propionic acid, lactic acid, oxalic acid, succinic acid, malic acid, citric acid, tartaric acid, ascorbic acid, methanesulphonic acid, ethanesulphonic acid, hydroxyethanolsulphonic acid, benzoic acid, salicylic acid, p-aminosalicylic acid, toluenesulphonic acid or camphorsulphonic acid.

The newly discovered active substance, its salts with pharmacologically harmless acids, as well as concentrated mixtures, according to the invention which still contain by-products are intended to be used as medicaments.

In order to obtain the complete extract which serves as starting material, start is made preferably from finely ground plant parts, especially the roots or bark of *Voacanga africana* Stapf. The production of suitable complete extracts can be effected in different ways, according to whether the alkaloids are extracted in the form of the salts naturally occurring in the plant or as the free bases, or after conversion into other, more readily soluble, salts.

In the form of the salts present in the plant, the alkaloids can be extracted, for example, by lower alcohols such as methanol or ethanol, if desired after previous wetting of the powdered plant material. A valuable extract can be obtained, for example, by operating according to the following methods:

An alcohol extract is evaporated to dryness in vacuo and the residue is treated with water or dilute aqueous solutions of lower fatty acids or mineral acids, for example, acetic acid, formic acid or hydrochloric acid. The active constituents are obtained from the aqueous or aqueous-acid solution, after adjustment of the pH value to over 4.5 by means of sodium bicarbonate, sodium carbonate, ammonia or caustic soda solution, by extraction with a weakly polar or non-polar organic solvent immiscible with water i.e. insoluble or only slightly soluble in water, such as a halogenated hydrocarbon or, preferably, benzene.

The free bases can advantageously be extracted from the plant material with weakly polar or non-polar organic solvents, such as halogenaated aliphatic hydrocarbons, e.g. chloroform, methylene chloride, ethylene chloride or trichlorethylene, or preferably with benzene, if the powdered root or bark is wetted before the extraction with a weakly alkaline aqueous solution of, for example, sodium bicarbonate, sodium acetate, sodium carbonate or ammonia.

For the conversion of the alkaloids into salts other than those occurring naturally in the plant, and for their extraction, acid aqueous extraction agents, for example, aqueous solutions of lower fatty acids such as formic acid, acetic acid or propionic acid, or of a phosphoric acid, or of an acid salt of a di- or poly-basic acid can be used. For the preparation of suitable active complete extracts the acid aqueous extracts of the powdered root, if need be after concentration in vacuo, are treated in the same way as the acid extracts of the evaporated alcohol extracts.

The following examples will illustrate more particularly the methods of carrying out the process according to the invention. Parts therein signify parts by weight, and these are to parts by volume as g. to cc. The temperatures are given in degrees centigrade.

*Example 1*

3000 parts of powdered bark from the root of *Voacanga africana* Stapf are percolated with about 30,000 parts by volume of methanol. The extract is concentrated to 1500 parts by volume and stirred into 5000 parts by volume of 5% acetic acid. After standing for several hours, the aqueous acetic acid solution is decanted from separated resinous constituents, concentrated in vacuo to 4500 parts by volume and adjusted to a pH value of 3.5. 40–50 parts of by-products are removed by extraction with 10,000 parts by volume of benzene in 5 portions. The aqueous phase is now adjusted to a pH of 6–7 by addition of ammonia and the crude bases thereby separated, 100–120 parts by weight altogether, are filtered by suction. By crystallising the mixture of crude bases from methanol, 45–55 parts of a crystallisate of melting point 212–218° (with decomposition) are separated. The methanolic solution remaining is evaporated to dryness, leaving a residue of 50–60 parts.

The evaporation residue so obtained is subjected to a multiplicative partition by the countercurrent principle between benzene as the upper phase and citric acid-phosphate buffer of pH 4.1 as the lower phase. An adequate separation for practical purposes is obtained when 10 parts of the evaporation residue are distributed in 24 separating funnels between 200 parts by volume each of upper and lower phases. After the last partition step, the lower phases are made alkaline with ammonia, the separating funnels are once again shaken and the upper phases, after washing out with water, are evaporated to dryness. The upper phases 10–15 contain 4–5 parts of the almost pure active substance, which is obtained on evaporation as a colourless solid scum. The upper phases 16–21 contain 2–3 parts of a crystallisate of melting point 214–216° (with decomposition).

*Example 2*

50 parts of the evaporation residue freed from crystallising by-products according to the first paragraph of Example 1 are extracted with petroleum ether in a Soxhlet apparatus. On cooling, about 25 parts of active substance separate as a pale yellow precipitate.

*Example 3*

20 parts of the evaporation residue freed from crystallising by-products according to Example 1 are dissolved in 80 parts by volume of 5% acetic acid, the solution is decolorised by treatment with active charcoal and treated with a saturated solution of potassium bromide while stirring until a further addition no longer produces further precipitation. The precipitated hydrobromide of the required active substance is filtered by suction and recrystallised from water or acetone. 8–10 parts of the pure active substance are thus obtained as crystalline hydrobromide: small colourless needles of melting point 265–266° (with decomposition).

To obtain the crystalline hydrobromide of the active substance according to the above example, obviously the fractions of active substance concentrated by countercurrent partition according to Example 1 or by petroleum ether extraction according to Example 2 can also be used.

In the manner described the active substance can also be obtained in crystalline form as the hydrochloride of melting point about 267° (with decomposition) or as the hydriodide of melting point about 264° (with decomposition).

*Example 4*

50 parts of the evaporation residue freed from crystallising by-products according to Example 1 are dissolved in 150 parts by volume of benzene and adsorbed on a chromatographic column which contains 1000 parts of neutral aluminium oxide of activity stage II–III according to Brockmann. By elution with approx. 5000 parts by volume of benzene, small quantities of accompanying substances are first obtained. A fraction of 25–30 parts, in which the required active substance is concentrated, is then eluted with a mixture of benzene and acetone in the proportions by volume of 9:1. By crystallising from methanol, about 2 parts of a crystallisate are separated therefrom and the evaporation residue of the residual methanolic solution is subjected to further purification by one of the operations described in Examples 1, 2 or 3.

*Example 5*

3000 parts of powdered bark from the root of *Voacanga africana* Stapf are percolated with about 30,000 parts by volume of methanol. The extract is concentrated to 1500 parts by volume and stirred into 5000 parts by volume of 5% acetic acid. After standing for several hours, it is decanted from the separated resinous constituents and the aqueous solution is adjusted to a pH value of 7–8 with sodium bicarbonate. It is then extracted with 6000 parts by volume of benzene in 3 portions. The benzene extract is dried with sodium sulphate and evaporated to dryness in vacuo. The 150–180 parts of residue, a brown powder, are chromatographed for further purification on 3000–36000 parts of neutral aluminium oxide of activity stage II–III according to Brockmann. For this purpose the residue, dissolved in 500 parts by volume of benzene is adsorbed on the aluminium oxide. By elution with benzene small quantities of a yellow oil and 25–30 parts by weight of a crystallisate of melting point 135–136° are first obtained. 60 to 70 parts by weight of an active fraction are then eluted with a mixture of benzene and ether in the proportions by volume of 3:1. From this, 45–50 parts by weight of an inactive crystallisate of melting point 215–217° (with decomposition) are separated by crystallisation from methanol. The residual methanolic solution is evaporated to dryness in vacuo and the 18–23 parts of evaporation residue are worked up according to Examples 1, 2 or 3.

To relieve pain, for example 10–50 mg. of the new alkaloid or a salt thereof can be administered together with 5 mg. of a salt of morphine or 10–20 mg. of a salt of codeine either parenterally or per os.

What I claim is:

1. Process for recovering a new cardio-active substance and its salts from the total extract of parts from plants of the genus *Voacanga africana*, comprising separating accompanying substances by extraction of an aqueous solution of the extract at a pH value between 2.8 and 3.8 with an organic solvent immiscible with water selected from the group consisting of benzene, diethyl ether and lower fatty acid ester, adjusting the aqueous phase to a pH value between 4.5 and 8, thus liberating the mixture of crude bases and separating said crude bases, dissolving them in a lower alkanol, allowing to crystallise, rejecting the crystals and recovering the new cardio-active substance from the alkanolic filtrate.

2. Process as claimed in claim 1, wherein the total extract of the root bark of *Voacanga africana* is used.

3. Process as claimed in claim 1 wherein the extraction is carried out at a pH of about 3.5.

4. Process as claimed in claim 1 wherein benzene is used as organic solvent immiscible with water.

5. Process as claimed in claim 1 wherein the crude bases are liberated and precipitated at a pH of 6–7.

6. Process as claimed in claim 1 wherein methanol is used as a lower alkanol.

7. Process as claimed in claim 1 wherein the mixture of crude bases is subjected to a rough separation with the aid of aluminum oxide and the evaporation residues of the eluates obtained with a weakly polar solvent selected from the group consisting of a mixture of benzene and acetone in the proportion of 9:1 by volume and a mixture of benzene and diethyl ether in the proportion of 3:1 by volume are subjected to crystallisation from a lower alkanol, the crystals being rejected and the new cardio-active substance being recovered from the filtrate.

8. Process as claimed in claim 7 wherein the adsorbent is aluminium oxide, the weakly polar solvent is a mixture of benzene and ether and the lower alkanol is methanol.

9. Process as claimed in claim 1 wherein the isolation of the new cardio-active substance is carried out by evaporating the alkanolic filtrate to dryness and the residue is subjected to countercurrent distribution between a water-immiscible phase selected from the group consisting of benzene, diethyl ether, ethyl acetate, halogenated hydrocarbons and mixtures thereof, and, as weakly acid aqueous phase, citric acid-phosphate buffer solution of pH about 4.1 and recovered from the intermediate fractions.

10. Process as claimed in claim 1 wherein the new cardio-active substance is recovered from the evaporation residue of the alkanolic filtrate by extraction with a solvent selected from the group consisting of low-boiling alkanes, petroleum ether, benzine, ligroin, cycloalkanes and mixtures thereof.

11. Process as claimed in claim 10 wherein the alkanolic filtrate is methanolic and the low-boiling hydrocarbon is petroleum ether.

12. Process as claimed in claim 1 wherein the new cardio-active substance is recovered as hydrohalide by crystallisation.

13. Process as claimed in claim 1 wherein the new cardio-active substance is recovered by crystallisation from a weakly acid aqueous solution as hydrobromide.

14. Process as claimed in claim 1 wherein the new cardio-active substance is recovered by subjecting the alkanolic filtrate to a rough separation with the aid of aluminum oxide, dissolving the evaporation residues of the eluates obtained with a weakly polar solvent selected from the group consisting of a mixture of benzene and acetone in the proportion of 9:1 by volume and a mixture of benzene and diethyl ether in the proportion of 3:1 by volume in methanol, allowing to crystallise, rejecting the crystals and recovering the new cardio-active substance from the methanolic filtrate.

15. Process as claimed in claim 14 wherein the alkanolic filtrate is methanolic, the adsorbent is aluminium oxide and the weakly polar solvent is a mixture of benzene and ether.

References Cited in the file of this patent

UNITED STATES PATENTS 2,823,204     Janot et al. _____ Feb. 11, 1958

OTHER REFERENCES

Janot et al.: Chem. Abstracts, vol. 49, p. 1719 (1955).